UNITED STATES PATENT OFFICE.

HENRY DREYFUS, OF BASEL, SWITZERLAND.

PROCESS OF MAKING ACETIC ANHYDRID.

1,368,789. Specification of Letters Patent. Patented Feb. 15, 1921.

No Drawing. Original application filed January 18, 1916, Serial No. 72,792. Patent No. 1,283,115, dated October 29, 1918. Divided and this application filed December 26, 1917. Serial No. 208,809.

*To all whom it may concern:*

Be it known that I, HENRY DREYFUS, a citizen of the Republic of Switzerland, residing at Basel, Switzerland, have invented new and useful Improvements in Processes of Making Acetic Anhydrid.

The present invention relates to improvements in the manufacture of acetic anhydrid and has for its object to provide a process whereby the manufacture of acetic anhydrid can be materially simplified, and a very pure product produced with a high yield.

The present invention is an improvement on the process of my French patent 478951, in which I have described the manufacture of acetic anhydrid, using pyrosulfate, obtained for example by heating sodium bisulfate *in vacuo*.

In French patent 448342 of September 16, 1912, and in its addition 17674 of April 18, 1913, I have proposed to manufacture acetic anhydrid or other anhydrids of acids of the fatty series, by causing acetate of sodium or other salts of the fatty acids to react with sulfuric anhydrid alone or mixed with sulfuric or chlorosulfonic acid, while cooling the reaction mixture comprising for example sodium acetate, before the introduction of the sulfuric anhydrid and sulfuric acid or chlorosulfonic acid.

According to my copending United States application Serial No. 72792 (which application has now matured into U. S. Patent No. 1,283,115, dated October 29, 1918, of which the present case is a division) the manufacture of acetic anhydrid is effected by causing a dry acetate such as acetate of sodium or of calcium, to react with sulfuric anhydrid, or sulfuric anhydrid mixed with sulfuric acid or chlorosulfonic acid, the reaction being conducted throughout in presence of a liquid diluent such as acetic anhydrid or acetic acid, and the temperature being maintained throughout the reaction below 5° C. and preferably below 0° C.

While this last mentioned process is capable of giving a pure acetic anhydrid in a good yield, I have found that the production of acetic anhydrid can be cheapened and the necessary apparatus be reduced by causing the dry acetate, such as acetate of sodium or of calcium, to react with addition products which are previously formed by reacting with sulfuric anhydrid upon an inorganic salt such as a chlorid or a sulfate, for example sodium chlorid, sodium sulfate, calcium sulfate or other appropriate chlorids or sulfates (chlorids and sulfates both being capable of reacting with free $SO_3$ to form addition products) whereby addition products are produced in a peculiar form which products are highly active for the subsequent conversion of the acetate salt into acetic anhydrid, based upon the loosely combined sulfuric anhydrid which they contain; these addition products are distinct in nature from the pyrosulfates referred to in my said French Patent 478951 and are far more active in power of converting the acetate salts into acetic anhydrid. It is essentially necessary that the treatment of the acetate salt with the above mentioned addition product containing the loosely held sulfuric anhydrid shall take place always in presence of a diluent or solvent, such as acetic anhydrid or acetic acid, as otherwise the required reaction for the production of acetic anhydrid does not take place to a material extent. Glacial acetic acid and acetic anhydrid are suitable diluents. The latter material, as usually purchased on the market, contains some acetic acid. Both of these substances are free or substantially free from wafer (the term "water" of course meaning molecules of $H_2O$, and not the "elements of water"). The two materials can be accordingly embraced within the expression "a substantially water-free acetic liquid incapable of reacting with acetic anhydrid," as is hereinafter used. These materials are both free from deleterious action on acetic anhydrid.

The reaction between the $SO_3$ and the chlorid or sulfate to form the above mentioned addition products is highly exothermic, but this is not objectionable, since the development of heat at this stage does not cause any injury, this being effected prior to mixing the addition product with either the diluent or the acetate. Accordingly this reaction can be effected rapidly, and ordinary means can be employed to remove the heat of reaction, either during or after completion of the reaction.

For carrying out the reaction between the dry acetate and the addition product containing the loosely combined sulfuric anhydrid it is necessary that the reaction mixture containing these substances and the diluent be cooled or maintained at not above ordinary temperature, for some time from the commencement of the reaction, the temperature being only afterward allowed to rise.

It is possible in producing the addition products containing the loosely bound sulfuric anhydrid, to introduce as much sulfuric anhydrid as can be completely absorbed or an excess may be employed, after which such excess of free or uncombined sulfuric anhydrid is removed by distillation from the addition product. It is advisable to employ somewhat less sulfuric anhydrid than the total amount which could be caused to combine with the inorganic salt, a deficiency of about 10 to 20% being preferred.

The reactions which take place during this part of the process may be as follows:—

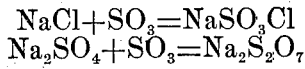

$$NaCl + SO_3 = NaSO_3Cl$$
$$Na_2SO_4 + SO_3 = Na_2S_2O_7$$

In producing the reaction between the inorganic addition product and the acetate, the materials should be employed in about the theoretically equivalent quantities, it being noted that one molecule of $SO_3$ corresponds to two molecules of sodium acetate or one molecule of calcium acetate. Thus taking for example the addition product resulting from the treatment of sodium sulfate with sulfuric anhydrid, the proportions for the reaction for the production of acetic anhydrid are taken in accordance with the equation:

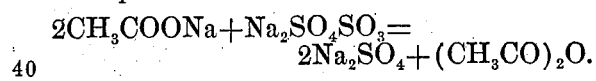

$$2CH_3COONa + Na_2SO_4SO_3 = 2Na_2SO_4 + (CH_3CO)_2O.$$

By virtue of the fact that a large amount of heat is set free during the reaction between the sulfuric anhydrid and the sodium sulfate or other inorganic salt, which heat has already been dissipated by cooling prior to the introduction of this addition product and acetate into the diluent, very much less heat is developed in the presence of the diluent and acetate, and hence very much less cooling is necessary to hold the temperature of the reaction mass sufficiently low to prevent decomposition of the acetic acid radical, so that a refrigerating machine may be dispensed with, though ordinary water or like cooling is necessary as before mentioned. Care should be taken that the diluent is present throughout the reaction and that for some time after the commencement of the reaction the temperature does not rise.

The diluent or solvent dissolves a portion of the acetate and in this way brings it into contact with the salt containing the sulfuric anhydrid, and thus causes the acetate to enter into reaction, with formation of an inorganic salt insoluble in the solvent or diluent, which salt is precipitated, and thus permits, by this precipitation, further amounts of the acetate to dissolve and to enter into reaction, and series of like operations continue until finally the whole of the acetate has entered into reaction.

In order to carry out this process practically I add the addition product containing sulfuric anhydrid to the dry acetate in the presence of the diluent or solvent while cooling or maintaining the temperature at not above ordinary temperature; then the reaction is allowed to set in while agitating and cooling until the reaction is nearly complete.

Afterward the temperature is raised gradually by appropriate heating to about 50° to 70° C. and is kept at this temperature until the reaction is complete, and finally the mass is further heated to distil off the acetic anhydrid formed. This distillation is preferably effected in vacuo.

For the purpose of more fully explaining my invention, I give the following specific example.

Into an apparatus provided with an agitator and capable of being heated and cooled, and containing 1600 kilos of dry sodium sulfate, there is introduced while rapidly agitating, 800 kilos of sulfuric anhydrid, without paying much attention to the temperature. The sulfuric anhydrid can be produced and introduced in any suitable manner.

The absorption takes place rapidly, and when the sulfuric anhydrid is entirely absorbed, as can be ascertained by a condenser no longer showing a reflux of boiling sulfuric anhydrid, then, while agitating, the resulting addition product is added progressively to a mixture of 1640 kilos of dry pulverized sodium acetate with 1600 kilos of acetic anhydrid, cooling appropriately to prevent a rise of temperature.

After some time the temperature is gradually raised to about 60° or 70° C., which temperature is maintained for some time in order to complete the reaction, and finally the acetic anhydrid is distilled off, preferably in vacuo.

The acetic anhydrid is obtained in a practically quantitative yield, and the product is of a purity which cannot be obtained direct by other processes.

While I have referred to the addition products of sodium sulfate and sulfuric anhydrid and have employed the formula $Na_2S_2O_7$, I desire to state that the said addition product is not the same in its action as ordinary pyrosulfate or as the product produced by heating sodium bisulfate in vacuo.

I claim:

1. A process of producing acetic anhydrid which comprises reacting with an addition product of sulfuric anhydrid and an inorganic salt capable of directly combining with such sulfuric anhydrid, upon a dry acetate in the presence of a diluent being a substantially water-free acetic liquid incapable of reacting with acetic anhydrid, and maintaining the temperature at not above ordinary room temperature until after the commencement of the reaction.

2. A process of producing acetic anhydrid, which comprises reacting with an addition product of sulfuric anhydrid and an inorganic salt of an alkali metal, which salt is capable of combining with such sulfuric anhydrid, upon a dry acetate in presence of a diluent being a substantially water-free acetic liquid incapable of reacting with acetic anhydrid, and maintaining the temperature at not above ordinary room temperature until after the commencement of the reaction.

3. A process of producing acetic anhydrid, which comprises reacting with an addition product of an inorganic salt of an alkali metal and sulfuric anhydrid, upon a dry acetate in presence of acetic anhydrid as a diluent, and maintaining the temperature at not above ordinary room temperature until after the commencement of the reaction.

4. A process of producing acetic anhydrid, which comprises reacting with an addition product of sulfuric anhydrid and an inorganic salt capable of combining with such sulfuric anhydrid, upon a dry acetate, in the presence of a diluent being a substantially water-free acetic liquid incapable of reacting with acetic anhydrid, and maintaining the temperature at not above ordinary room temperature during the first part of the process, and thereafter raising the temperature to complete the reaction, and distilling off the acetic anhydrid.

5. A process of producing acetic anhydrid, which comprising reacting with an addition product of sulfuric anhydrid and an inorganic salt capable of combining with such sulfuric anhydrid, upon a dry acetate, in the presence of a diluent being a substantially water-free acetic liquid incapable of reacting with acetic anhydrid, and maintaining the temperature at not above ordinary room temperature during the first part of the process, and thereafter raising the temperature to complete the reaction and distilling off the acetic anhydrid under a pressure below atmospheric.

6. A process of producing acetic anhydrid, which comprises bringing an addition product of sulfuric anhydrid and a neutral inorganic salt capable of combining with such sulfuric anhydrid, into contact with a dry acetate capable of reacting with such addition product, in the presence of a diluent being an acetic liquid incapable of reacting with acetic anhydrid maintaining the temperature at not above ordinary room temperature during the early stages of the process, and thereafter raising the temperature gradually to about 50–70° C. to complete the reaction, and afterward distilling off the acetic anhydrid.

7. In the formation of acetic anhydrid, the herein described step of bringing an addition product of sulfuric anhydrid with a salt of an alkali-forming metal capable of combining therewith, into contact with an acetate, at not above ordinary room temperature, in the presence of a diluent being an acetic liquid incapable of reacting with acetic anhydrid.

8. A process of making acetic anhydrid, which comprises bringing an addition product of sulfuric anhydrid with a salt of an alkali-forming metal capable of combining therewith, into contact with a dry acetate in the presence of acetic anhydrid as diluent, while at below ordinary atmospheric temperature.

9. A process of making acetic anhydrid, which comprises bringing an addition product of sulfuric anhydrid with a neutral salt of an alkali-forming metal capable of combining therewith, into contact with a dry acetate in the presence of a substantially water-free acetic liquid vehicle incapable of reacting with acetic anhydrid, and maintaining the temperature at not above ordinary room temperature until after the reaction has started and thereafter raising the temperature to complete the reaction, and afterward distilling off the acetic anhydrid.

In testimony whereof I have hereunto subscribed my name.

HENRY DREYFUS.

Witnesses:
Thomas L. Whitehead,
Robert Minton Spearpont.